United States Patent
Ten

(10) Patent No.: US 7,236,179 B2
(45) Date of Patent: Jun. 26, 2007

(54) DISPLAY DEVICE COLOR CHANNEL RECONSTRUCTION

(75) Inventor: Arkady Ten, Roseville, MN (US)

(73) Assignee: Eastman Kodak Company, Rochester, NY (US)

( * ) Notice: Subject to any disclaimer, the term of this patent is extended or adjusted under 35 U.S.C. 154(b) by 555 days.

(21) Appl. No.: 10/695,545

(22) Filed: Oct. 28, 2003

(65) Prior Publication Data

US 2005/0088389 A1 Apr. 28, 2005

(51) Int. Cl.
*G09G 5/02* (2006.01)

(52) U.S. Cl. .................. 345/589; 345/590; 345/593; 345/594; 345/597

(58) Field of Classification Search ............... 345/589, 345/590, 593, 594, 597
See application file for complete search history.

(56) References Cited

U.S. PATENT DOCUMENTS

| 6,611,249 B1 | 8/2003 | Evanicky et al. | |
| 6,712,993 B2 * | 3/2004 | Kijima et al. | 252/301.4 R |
| 2003/0147085 A1 * | 8/2003 | Mikkelsen et al. | 356/504 |

FOREIGN PATENT DOCUMENTS

EP 0 539 943 A1 5/1993

OTHER PUBLICATIONS

Yasuhiro Yoshida and Yoichi Yamamoto, "Color Management of Liquid Crystal Display Placed under Light Environment," XP-001144212, Electronics and Communications in Japan, Part 3, vol. 86, No. 7, 2003, 14 pgs.

European Search Report from EP Application No. 04024913.8-2217, dated Feb. 28, 2005, 5 pgs.

Wu, S. and Yang, D., Reflective Liquid Crystal Displays. John Wiley & Sons Ltd., p. 35-37, 2001.

Berns, Roy S., et al. "Estimating Black-Level Emissions of Computer-Controlled Displays," Wiley Periodicals, Inc., vol. 28, No. 5, Oct. 2003.

U.S. Appl. No. 10/695,035, entitled "Display Device Light Leakage Compensation," filed Oct. 28, 2003, by Arkady Ten.

* cited by examiner

*Primary Examiner*—Matthew C. Bella
*Assistant Examiner*—Mike Rahmjoo
(74) *Attorney, Agent, or Firm*—Shumaker & Sieffert

(57) ABSTRACT

In general, the invention relates to techniques for reconstructing color channels in a multi-channel display device. The invention may be particularly useful in reconstructing the light source spectra for the color channels of liquid crystal displays (LCD). In order to accurately model and calibrate a display device, an accurate light source spectrum estimate for each of the individual color channels is needed. In accordance with the invention, a light source spectrum can be determined for each color channel of a display based on measured emission spectra for the color channels, an inverted contrast ratio for the display, and an assumed transmission spectrum for a light valve in the display. The invention provides techniques to compensate for light leakage from adjacent color channels with regards to wavelength dependent transmissions that cause hue shifts in images reconstructed by the display device.

32 Claims, 6 Drawing Sheets

DISPLAY DEVICE COLOR CHANNEL RECONSTRUCTION

TECHNICAL FIELD

The invention relates to color imaging and, more particularly, to presentation of color images on display devices.

BACKGROUND

Color display devices are typically multi-channel devices in the sense that multiple physical color channels represent every pixel on the display. Multi-channel display devices include cathode ray tubes (CRT), liquid crystal displays (LCD), plasma displays, and other imaging devices. One common example of a multi-channel device is a three channel device comprising red, green, and blue (RGB) channels.

Each of the color channels in a multi-channel display device may be modeled as a combination of a light source and a light valve. In the case of the LCD, the light source typically comprises a common backlight and color filters for each of the channels. The light valve, in the case of an LCD, comprises one or two fixed polarizers and liquid crystal cells (LCC), which rotate a polarization plane of passing light to regulate the amount of light emitted from the display.

An emission spectrum for the light source is useful for spectral modeling and display calibration to improve color accuracy of imagery presented by the display. However, the light source emission spectrum is usually unknown, partially because the spectra of light sources vary between different manufacturers and models of display devices and from device to device. Further, the emission spectrum for a light source may change over time due to component aging, especially in the case of an LCD, which uses luminescent lamps as the common backlight.

SUMMARY

In general, the invention relates to techniques for reconstructing color channels in a multi-channel display device. The invention may be particularly useful in reconstructing the light source spectra for the color channels of liquid crystal displays (LCD). In order to accurately model and calibrate a display device, an accurate light source spectrum estimate for each of the individual color channels is needed.

In accordance with the invention, a light source spectrum can be determined for each color channel of a display based on measured emission spectra for the color channels, an inverted contrast ratio for the display, and an assumed transmission spectrum for a light valve in the display. The invention provides techniques to compensate for light leakage from adjacent color channels with regard to wavelength dependent transmissions that cause hue shifts in images presented by the display device.

In one embodiment, the invention is directed to a method comprising measuring a first emission spectrum of a display for a maximum display level, measuring a second emission spectrum of the display for a minimum display level, and measuring cumulative emission spectra for each of a plurality of color channels of the display with the respective color channel at a maximum level and the other channels at minimum levels. The method further includes assuming a transmission spectrum for a light valve in the display operating at a maximum level, and determining an inverted contrast ratio based on the first emission spectrum measurement and the second emission spectrum measurement. A set of equations is created for the color channels based on the measured cumulative emission spectra for the color channels, the measured inverted contrast ratio, and the assumed transmission spectrum. The equation set is then solved to determine a light source spectrum for each of the color channels.

In another embodiment, the invention is directed to a system including a display, a plurality of color channels in the display, a light source and a light valve to model each of the color channels, and means for driving the light valve based on a color profile defined by light source spectra. The light source spectra are reconstructed from measured emission spectra for the color channels, an inverted contrast ratio for the display, and an assumed transmission spectrum for the light valve in the display.

In a further embodiment, the invention is directed to a method which determines a light source spectrum for each of a plurality of color channels of a display based on measured emission spectra for the color channels, an inverted contrast ratio for the display, and an assumed transmission spectrum for a light valve in the display.

In an added embodiment, the invention is directed to a computer-readable medium containing instructions. The instructions cause a programmable processor to receive cumulative emission spectrum measurements for each of a plurality of color channels of a display with the respective color channel at a maximum level and the other channels at minimum levels, assume a transmission spectrum for a light valve in the display operating at a maximum level, and determine an inverted contrast ratio for the display. The computer-readable medium contains further instructions that cause the programmable processor to solve a set of equations to determine a light source spectrum for each of the color channels based on the measured cumulative emission spectra for the color channels, the inverted contrast ratio, and the assumed transmission spectrum, and drive the light valve based on a color profile defined by the light source spectra.

In another embodiment, the invention is directed to a method comprising measuring cumulative emission spectra for each of a plurality of color channels of a display with the respective color channel at a maximum level and the other channels at minimum levels, assuming a first transmission spectrum for a light valve in the display operating at a maximum level, and assuming a second transmission spectrum for the light valve in the display operating at a minimum level. The method further comprises calculating an inverted contrast ratio based on the first transmission spectrum assumption and the second transmission spectrum assumption, creating a set of equations for the color channels based on the measured cumulative emission spectra for the color channels, the inverted contrast ratio, and the assumed first transmission spectrum, and solving the equations to determine a light source spectrum for each of the color channels.

The invention is capable of providing many advantages. The described embodiments can improve color accuracy, and reduce color accuracy variation for images presented by different types and brands of display devices. In display devices such as LCDs, for example, the light valve transmission spectrum is dependent on a wavelength and a digital driving signal. The described embodiments take the wavelength dependency and its subsequent effects on the light source spectrum into account. For example, the color channels cannot achieve a fully closed state, even when set at a minimum level, due to transmission spectrum wavelength dependency. The emission spectra measurements for each of the maximum level color channels include light leakage from the minimum level, adjacent color channels. The light source emission spectra measurement accuracy improves due to compensation of the excess light emission. Such compensation allows for the more accurate calibration of a display device color model and reduces non-physical effects in model calibration caused by contamination of the measurements by light leakage. The capability of reconstructing the light source spectra adds flexibility to color applications and allows for less dependency on particular types and brands of display devices to present imagery with consistent color quality.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
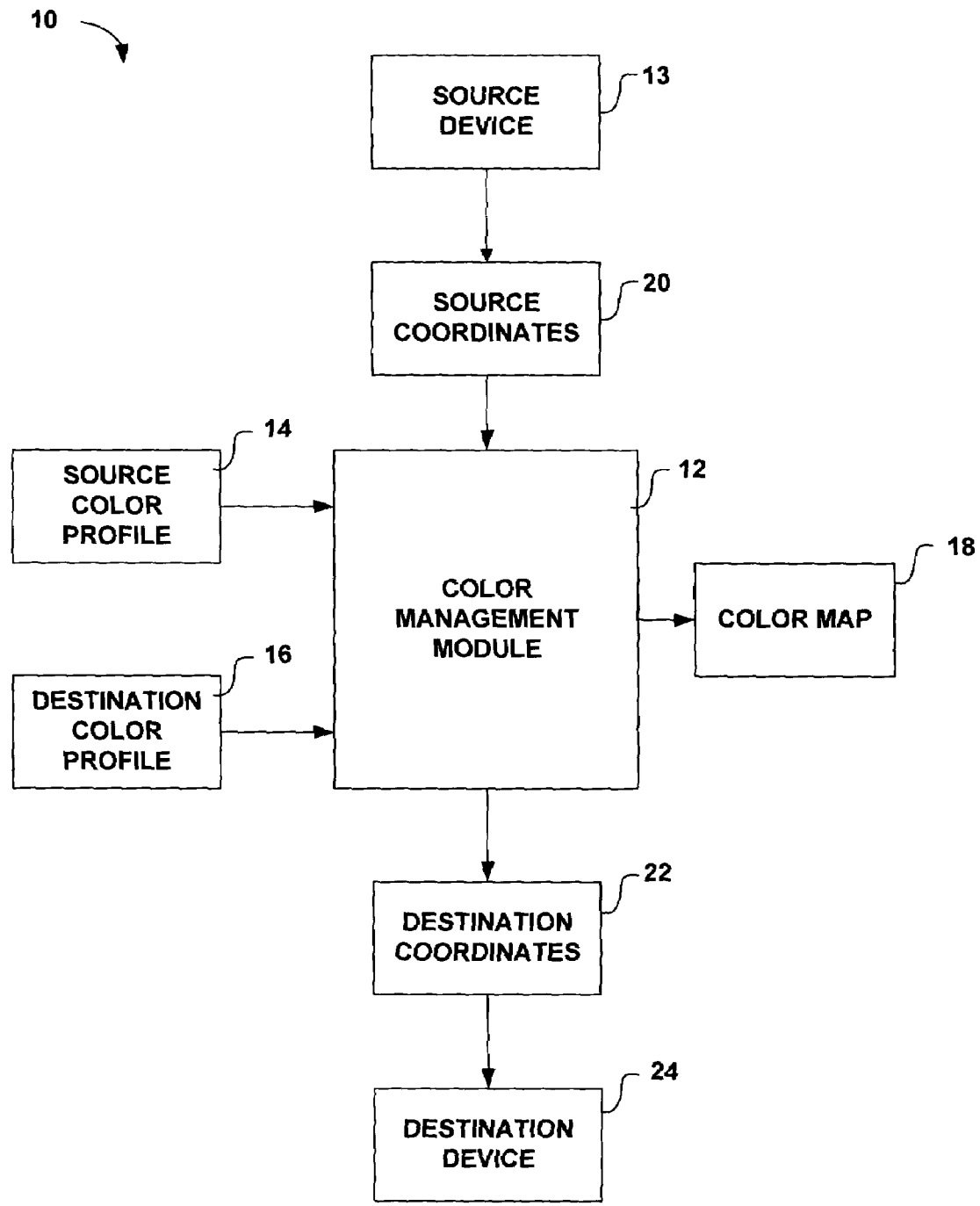
FIG. 1 is a block diagram illustrating a color management system that makes use of color profiles formulated for a display device in accordance with the invention.

FIG. 1 is a block diagram illustrating a color management system 10 that makes use of color profiles formulated for a display device in accordance with the invention. As will be described, the color profiles are built based on a display device color model that makes use of a light source spectrum reconstruction for a multi-channel color display device that takes into account light leakage from adjacent color channels and wavelength dependent transmissions. The wavelength dependency causes hue shifts in the images reconstructed by the display device, as discussed in *Reflective Liquid Crystal Displays* by Wu S. and Yang D., John Wiley & Sons Ltd, p. 335, 2001. By taking into account light leakage from adjacent color channels and wavelength dependent transmissions, the color profiles used by color management system 10 promote increased color image accuracy between images produced on different multi-channel color display devices.

As shown in FIG. 1, color management system 10 includes a color management module 12 that generates a color map 18 between a source device 13 and a destination device 24 based on a source color profile 14 and a destination color profile 16. Color map 18 defines a conversion between source coordinates 20 associated with source device 13 and destination coordinates 22 associated with destination device 24. Destination device 24 may be a multi-channel color display devices including a liquid crystal display (LCD), a cathode ray tube (CRT) display, a plasma display, or the like. In some embodiments, source device 13 may be a scanner, a camera, or the like that acquires an image. An original image obtained by source device 13 is color corrected by color management module 12 using color map 18 prior to being displayed via the destination display device 24. In another embodiment, a color management module may color correct an original image of a source device without generating a color map by using a combination of source and destination color profiles.

Color management module 12 may be realized by one or more software processes executing on a processor such as a desktop computer or workstation. Module 12 executes computer-readable instructions to support, at least in part, the functionality described herein. Color management module 12 facilitates color matching between destination device 24 and source device 13. Source color profile 14 specifies a set of color response characteristics associated with source device 13. Destination color profile 16 specifies a set of color response characteristics associated with destination device 24.

Source and destination color profiles 14, 16 permit reconciliation of color response differences between source device 13 and destination device 24 so that an image obtained by source device 13 can be accurately represented on destination display device 24. Source and destination color profiles 14, 16 may generally conform to profiles specified by the International Color Consortium (ICC). Source coordinates 20 specify color image values for an image in a device-dependent coordinate system associated with source device 13, e.g., RGB in the event source device 13 is a scanner. Destination coordinates 22 specify color image values for an image in a device-dependent coordinate system associated with destination device 24.

Figure 2:
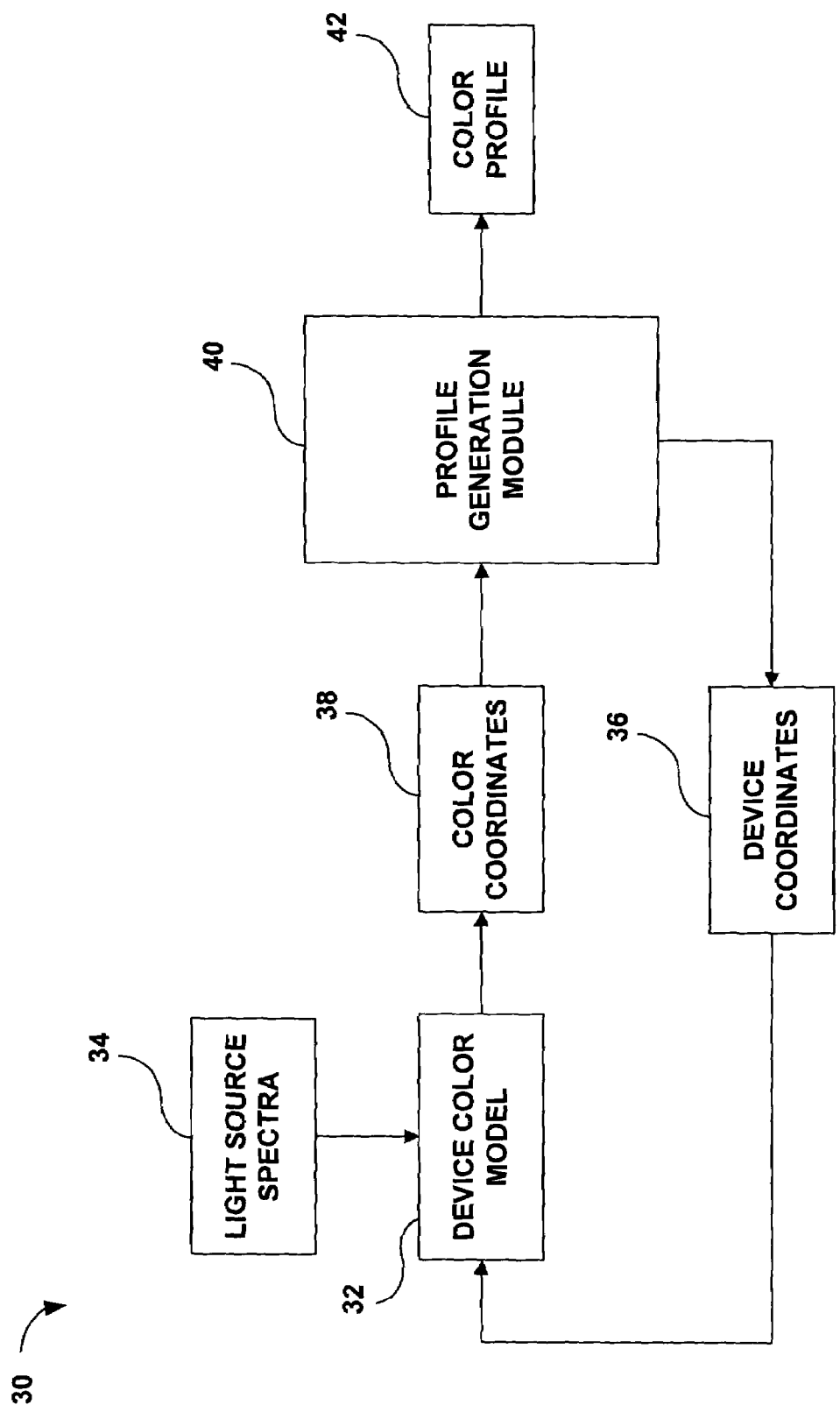
FIG. 2 is a block diagram illustrating a color profile generation system that generates a color profile based on a display device color model.

FIG. 2 is a block diagram illustrating a color profile generation system 30 according to an embodiment of the invention. Within system 30, a profile generation module 40 generates a color profile 42 based on data obtained from a display device, such as destination display device 24 of FIG. 1. The data obtained from the display device include light source spectra 34 and device coordinates 36, which are representative of the output characteristics of light sources and light valves, respectively, which form part of the display device. A device color model 32 uses light source spectra 34 and device coordinates 36 to generate color coordinates 38. Profile generation module 40 builds color profile 42 based on the relationship between device coordinates 36 and color coordinates 38. In the case illustrated in FIG. 2, light source spectra 34 are included to improve calibration accuracy of device color model 32 and therefore, improve accuracy of color coordinates 38 and color profile 42. In some embodiments, a device color model does not input light source spectra and generates color coordinates based only on device coordinates, e.g. RGB.

In other embodiments, a color profile is built without a device color model; however, an accurate color profile would require a significant number of measurements. Building and calibrating a device color model reduces the number of measurements needed to build a color profile as no additional measurements are needed after the device color model is calibrated. The device color model provides a response similar to a display device, but generates device-independent color coordinates.

Profile generation module 40 sends device coordinates 36 to device color model 32 and receives a modeled response in the form of color coordinates 38. Profile generation module 40 then creates color profile 42 that is capable of converting images from device-independent color coordinates to device specific coordinates. Profile generation module 40 may be configured to control device coordinates 36, and therefore the light valves in the display device to obtain color coordinates 38 from device color model 32, and generate color profile 42 based on the received data. As will be described, light source spectra 34 are calculated from equations based on measured and assumed spectral emissions of the display device.

The display device may comprise any number of color channels, but for purposes of illustration, will be described herein as a three-channel display system with a red channel, a green channel, and a blue channel (RGB). Each pixel of an exemplary display device, such as an LCD, includes three color channels that combine to generate the color needed to accurately reproduce a pixel of an image. Each of the color channels includes one of the light sources and one of the light valves that may be manipulated to achieve the color specified for the pixel. The light source emission spectrum 34 $S_i(\lambda)$ of the $i^{th}$ channel is a function of the wavelength, $\lambda$, and determines the color of the channel. The light source comprises a combination of a backlight $B(\lambda)$ and a color filter $F_i(\lambda)$ for the $i^{th}$ color channel, as follows:

$$S_i(\lambda) = B(\lambda) * F_i(\lambda) \quad (1)$$

The light valve transmission spectrum $\phi(d, \lambda)$ is controlled by device coordinates 36 and may be assumed to be identical for every color channel. In a typical LCD device, stationary polarizers and liquid crystal cells (LCC) with controllable phase retardations constitute the light valves. A voltage applied to the LCC is dependent upon the digital driving signal d and determines the phase retardation for passing light. For polarized light, the phase retardation controls rotation of a polarization plane of the light and therefore, the wavelength dependent intensity of light transmitted through the light valves. An emission spectrum for an individual color channel i and for a given digital level d may be expressed as a product of the light source emission spectrum $S_i(\lambda)$ and the light valve transmission spectrum $\phi(d,\lambda)$ as follows:

$$E_i(d,\lambda) = S_i(\lambda) * \phi(d,\lambda) \quad (2)$$

A cumulative emission spectrum for a pixel is a summation of all N individual color channels, in this case the red, green, and blue color channels.

$$E(d_r, d_g, d_b, \lambda) = \sum_{i=1}^{N} E_i \quad (3)$$
$$= S_r(\lambda) * \phi(d_r, \lambda) + S_g(\lambda) * \phi(d_g, \lambda) + S_b(\lambda) * \phi(d_b, \lambda)$$

The light sources determine the color of light emitted for each of the color channels. The digital driving signal d controls the intensity of light transmitted by the light valves for each of the color channels.

In accordance with the invention, profile generation module 40 generates color profile 42 for the LCD based on color coordinates 38, which are determined by device color model 32 from light source spectra 34 and device coordinates 36. The resulting color profile 42 represents the color response characteristics of the LCD device. In order to accurately generate color profile 42 for any type or brand of LCD, light source spectra 34 must be determined from display measurements and calculations. The calculations compensate for adjacent channel leakage and light valve wavelength dependency that create inaccuracies in direct light source spectral measurements. The compensated light source spectra 34 improve calibration of device color model 32 and therefore create a more accurate color profile 42 for the display device. Profile generation module 40 may be realized by one or more software processes executing on a processor such as a desktop computer or workstation.

Figure 3:
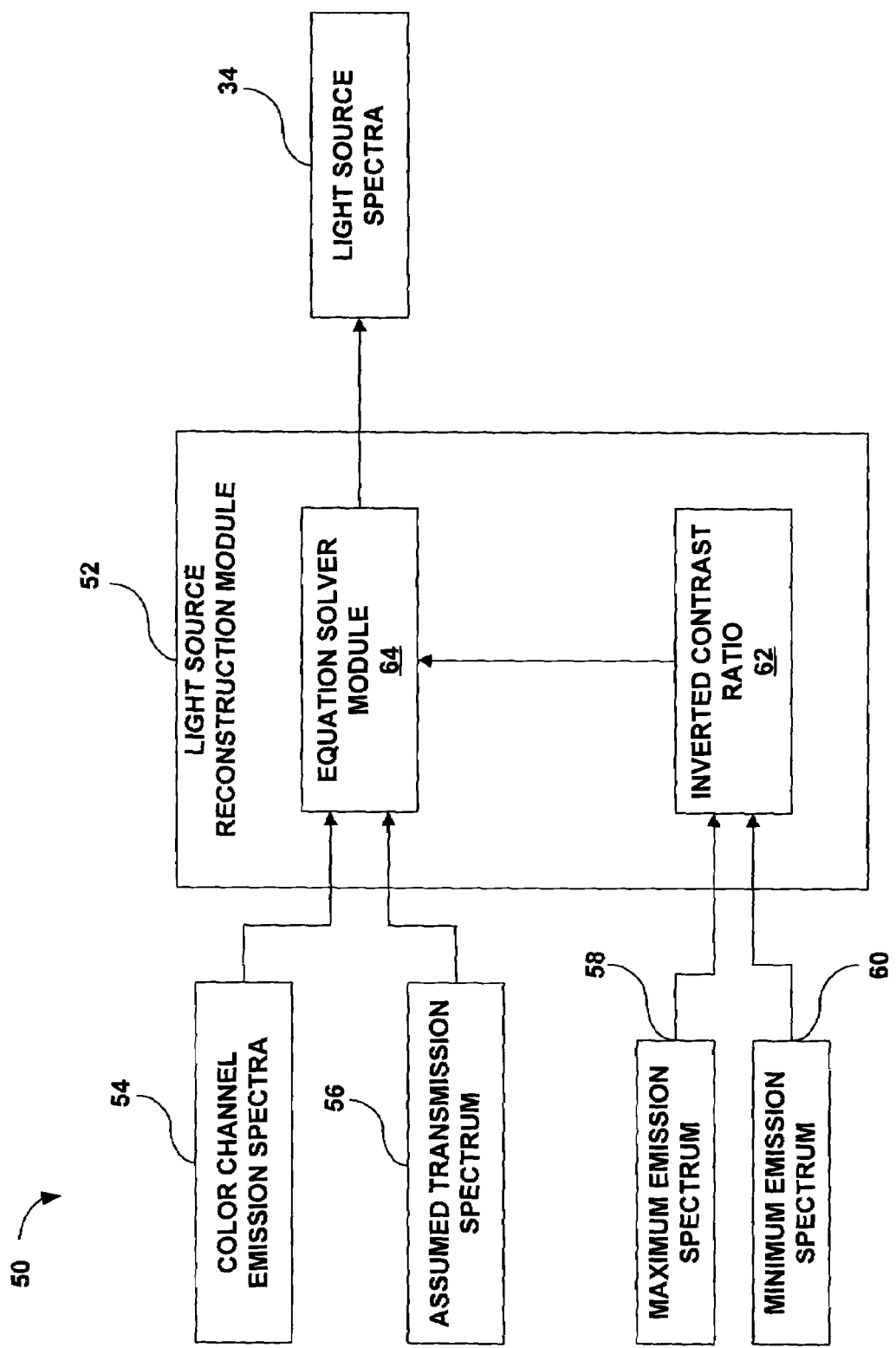
FIG. 3 is a block diagram illustrating a light source reconstruction system that reconstructs light source spectra based on display device spectral emission measurements.

FIG. 3 is a block diagram illustrating a light source reconstruction system 50 that generates light source spectra 34 from display device spectral emission measurements. In the example of FIG. 3, the spectral emission measurements are from the three-channel LCD described above. System 50 includes color channel emission spectra 54, an assumed transmission spectrum 56, a maximum emission spectrum 58, and a minimum emission spectrum 60 input to a light source reconstruction module 52. Light source reconstruction module 52 makes use of an inverted contrast ratio 62 and an equation solver module 64. Equation solver module 64 generates light source spectra 34 based on color channel emission spectra 54, assumed transmission spectrum 56, and inverted contrast ratio 62. In particular, light source spectra 34 are determined by solving equations based on the measured color channel emission spectra 54, assumed transmission spectrum 56, and inverted contrast ratio 62.

The measured emission spectra of the display for the red, green, and blue channels are included in color channel emission spectra 54. Color channel emission spectra 54 comprise cumulative emission measurements of each color channel with the respective color channel at a maximum level and the other channels at minimum levels. For example, the red channel emission spectrum comprises the cumulative emission measurement of the display when the red channel is at the maximum digital driving signal and the green channel and blue channel are at the minimum digital driving signal. The green channel and blue channel minimum level emissions cannot be assumed negligible, however, and can generate significant emission even when the pertinent light valves are turned "off." In particular, the minimum level light valve transmission spectrum $\phi(0,\lambda)$ is still dependent on wavelength. Consequently, the light valves cannot fully close to block all light from being emitted. The resulting emissions for the red $(255,0,0,\lambda)$, green $(0,255,0,\lambda)$ and blue $(0,0,255,\lambda)$ channels, at maximum 8-bit (255) drive levels with adjacent channels at minimum drive levels, are represented as follows:

$$\hat{E}(255,0,0,\lambda) = S_r(\lambda)*\phi(255,\lambda) + S_g(\lambda)*\phi(0,\lambda) + S_b(\lambda)*\phi(0,\lambda)$$

$$\hat{E}(0,255,0,\lambda) = S_r(\lambda)*\phi(0,\lambda) + S_g(\lambda)*\phi(255,\lambda) + S_b(\lambda)*\phi(0,\lambda) \quad (4)$$

$$\hat{E}(0,0,255,\lambda) = S_r(\lambda)*\phi(0,\lambda) + S_g(\lambda)*\phi(0,\lambda) + S_b(\lambda)*\phi(255,\lambda)$$

where E is emission, S is the spectral contribution of light source, and $\phi(255,\lambda)$ is the digital driving value for a given light valve. The assumed transmission spectrum 56 is determined for the maximum digital driving signal, $\phi(255,\lambda)$. In this case, the maximum digital driving signal represents an 8-bit system for purposes of example. Of course, other n-bit systems are possible. The determination may be made by assuming the measured color channel emission spectra 54 constitute the light source spectra for the color channels, using default parameters for a particular type or brand of LCD, or squaring a cosine or sine function of phase retardation associated with the light valves. The main function of assumed transmission spectrum 56 is to normalize the measured color channel emission spectra 54 and compensate for the wavelength dependency of the light valves.

Inverted contrast ratio 62 may be based on the maximum level transmission spectrum $\phi(255,\lambda)$ and the minimum level transmission spectrum $\phi(0,\lambda)$ for a given channel. Although both of the transmission spectrum values may be assumed, as described for assumed transmission spectrum 56, the uncertainty of the rough approximations may introduce significant error in light source spectra 34, which is perceived as a hue shift in color profile 42. In the embodiment illustrated in FIG. 3, a measured contrast ratio, $\hat{C}$, is used in place of the assumed ratio. Maximum emission spectrum 58 of the display is measured for all of the color channels in the display at the maximum level, and minimum emission spectrum 60 is measured for all the color channels at the minimum level. As can be seen, the inverted ratio of emission spectrum measurements 58 and 60 is equivalent to the assumed transmission spectrum ratio.

$$\hat{C} = \frac{\hat{E}(0, 0, 0, \lambda)}{\hat{E}(255, 255, 255, \lambda)} \quad (5)$$

$$= \frac{(S_r(\lambda) + S_g(\lambda) + S_b(\lambda)) * \phi(0, \lambda)}{(S_r(\lambda) + S_g(\lambda) + S_b(\lambda)) * \phi(255, \lambda)}$$

$$= \frac{\phi(0, \lambda)}{\phi(255, \lambda)}$$

As a result, equations for the reconstruction of all channels include only one assumed variable and produce a converging set of equations that can be solved by iteration. Accordingly, light source reconstruction module 52 applies the input values to equation solver module 64. Equation solver module 64 creates a light source emission equation for each of the color channels. For the case in which inverted contrast ratio 62 is based on the measured emission spectra for maximum and minimum display levels, as in equation (5), the light source spectrum equations may be expressed as:

$$S_r(\lambda) = \frac{\hat{E}(255, 0, 0, \lambda)}{\phi(255, \lambda)} - (S_g(\lambda) + S_b(\lambda)) * \hat{C}(\lambda) \quad (6)$$

$$S_g(\lambda) = \frac{\hat{E}(0, 255, 0, \lambda)}{\phi(255, \lambda)} - (S_r(\lambda) + S_b(\lambda)) * \hat{C}(\lambda)$$

$$S_b(\lambda) = \frac{\hat{E}(0, 0, 255, \lambda)}{\phi(255, \lambda)} - (S_r(\lambda) + S_g(\lambda)) * \hat{C}(\lambda)$$

The first members of equations (6) are normalized on the assumed maximum light valve transmission 56. The normalization compensates wavelength dependency of the transmission spectrum. The second members of equations (6) are light leakage compensation that, for example, model the excess light passed through the minimum level green and blue channels while operating the red channel at the maximum level.

Equation solver module 64 solves the light source spectrum equations, (6). Equation set (6) converges, which allows equation solver module 64 to solve the set by iterations. A high inverted contrast ratio 62 ensures that equation set (6) will converge. The outputs of equation solver module 64 are reconstructed light source emission spectra 34. Light source emission spectra 34 include light source spectra for each of the color channels in the LCD device. The light source spectra 34 improve calibration accuracy of device color model 32 to accurately model the display device and generate color profile 42, as shown in FIG. 2. System 50 improves the color accuracy of the multi-channel LCD by compensating light leakage contamination in light source spectral measurements.

Figure 4:
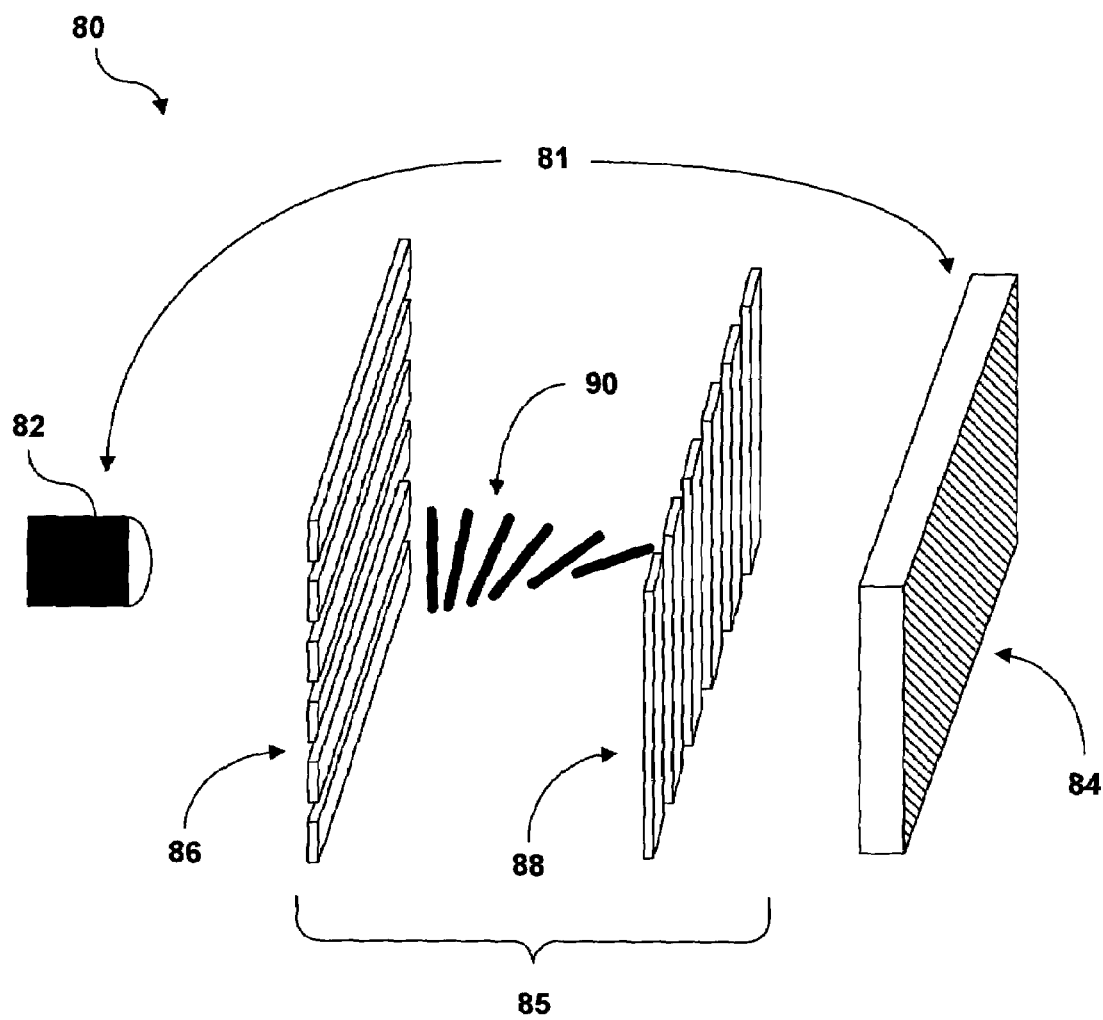
FIG. 4 is a schematic diagram illustrating a color channel of a multi-channel liquid crystal display (LCD) device as a portion of the light source reconstruction system from FIG. 3.

FIG. 4 is a schematic diagram illustrating a color channel 80 of a typical liquid crystal display (LCD) device as a portion of light source reconstruction system 50, from FIG. 3. Color channel 80 includes a light source 81 and a light valve 85. Light source 81 includes a backlight 82 and a color filter 84. Light valve 85 includes a first polarizer 86, a second polarizer 88, and liquid crystal cells (LCC) 90 disposed between the polarizers 86 and 88.

Backlight 82 emits light to every pixel, and therefore every color channel 80. First polarizer 86 of light valve 85 polarizes the passing light from backlight 82. LCC 90 rotates the polarization plane of the passing light. The amount of light transmitted by light valve 85 depends on an orientation of the polarization plane of the passing light relative to second polarizer 88. An angle of rotation of the polarization plane depends on a voltage or digital driving signal applied to LCC 90 and a wavelength of the light. Color filter 84 filters the light transmitted by light valve 85 to define the color of channel 80. In the case of the three-channel LCD described above, color filter 84 may be a red, green, or blue filter.

Light source reconstruction system 50, from FIG. 3, may improve the color accuracy of images displayed by the LCD. System 50 uses display emission measurements to create and calibrate display device color model 32, which is then used to create color profile 42 for the display. Color profile 42 drives light valve 85, e.g., from a host computer coupled to a destination display device, to generate a precise color output from color channel 80 and the LCD. Display device emission may vary between types and brands of displays. The color profile 42 built by color profile generation system 30 from FIG. 2 may allow any LCD device to more accurately present the intended color of an image obtained by a source device.

Figure 5:
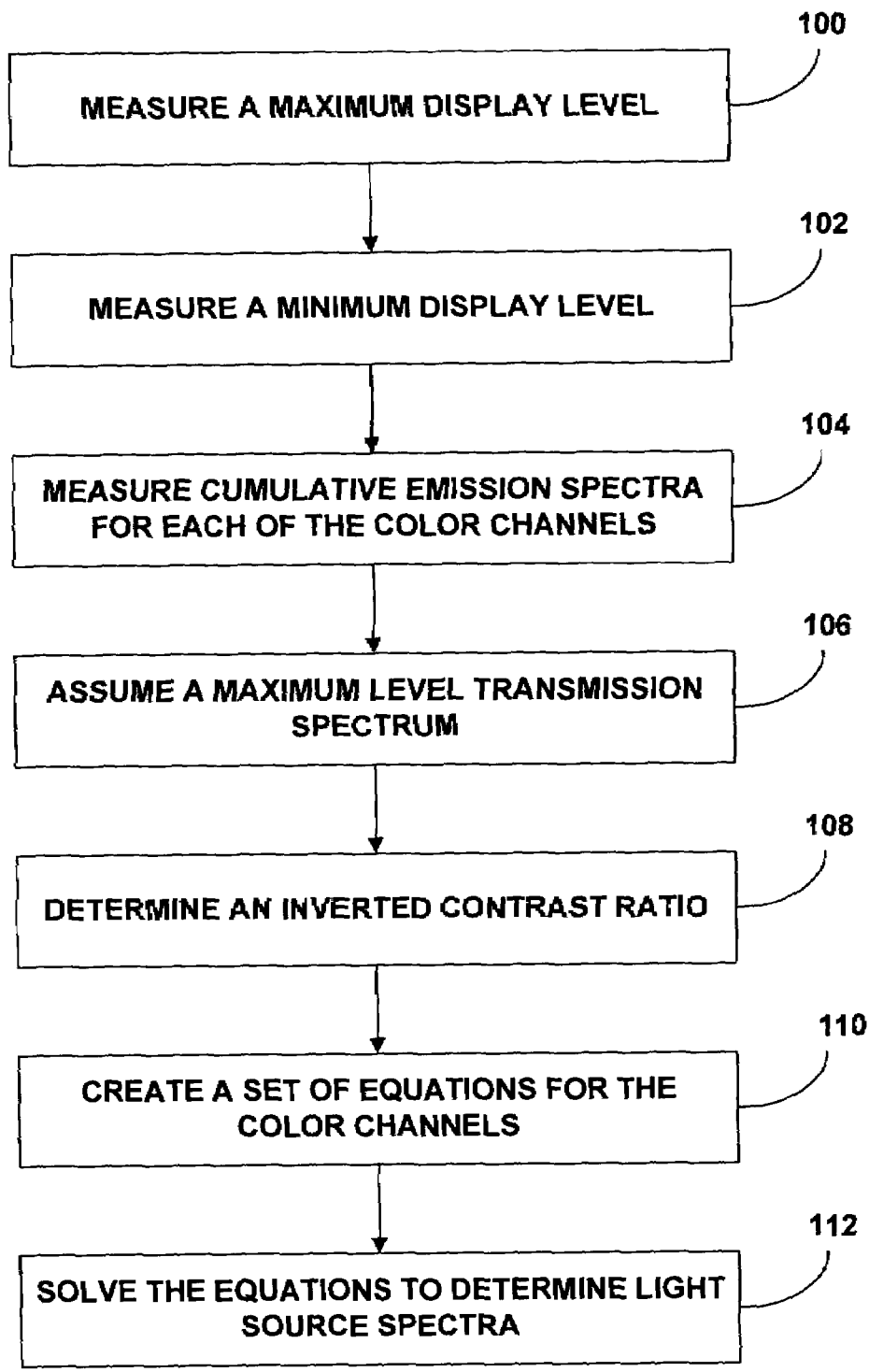
FIG. 5 is a flow diagram illustrating a method for reconstructing light source emission spectra for the multi-channel liquid crystal display.

FIG. 5 is a flow diagram illustrating a method for reconstructing light source emission spectra 34 for the multi-channel liquid crystal display described above. Light source reconstruction system 50 from FIG. 3 reconstructs the light source spectra 34 to create and calibrate device color model 32. Device color model 32 may model the LCD and generate color coordinates 38 used to build color profile 42 for the LCD.

Measurements and assumptions from the display device are used to generate light source spectra 34. Maximum emission spectrum 58 is measured (100) for all color channels 80 set at a maximum level, which may also be considered an emission of white light. Minimum emission spectrum 60 is then measured (102) for all of the color channels 80 set at a minimum level, which may be considered a black emission. Cumulative emission spectra 54 are measured for each of the individual color channels 80 (104) with the respective channel at a maximum level and the other channels at minimum levels.

Assumed transmission spectrum 56 is assumed for the light valves 85 within the LCD operating at a maximum level (106). Assumed transmission spectrum 56 is known with accuracy between 5% and 20%. One of the assumption methods discussed in reference to FIG. 3 may be used to determine the assumption. Inverted contrast ratio 62 is determined (108) based on the maximum and minimum emission spectrum measurements 58 and 60.

The color channel emission spectra 54, assumed transmission spectrum 56, and measured inverted contrast ratio 62 are used by equation solver module 64 in light source reconstruction module 52 to create a set of equations for light source emission spectra of the color channels 80 (110). The set of equations is then solved by equation solver module 64 for each of the light source spectra 34 (112).

Accurate light source emission spectra 34 are very important for calibration of spectral models. Optimization of a spectral model by the method illustrated in FIG. 5 results in per-channel accuracy of less than $\Delta E=4$. Although the human eye can perceive hue shifts greater than $\Delta E=3$, the color reconstruction method far surpasses the shift of $\Delta E=16$ experienced when no reconstruction method is applied to the light sources 81.

Figure 6:
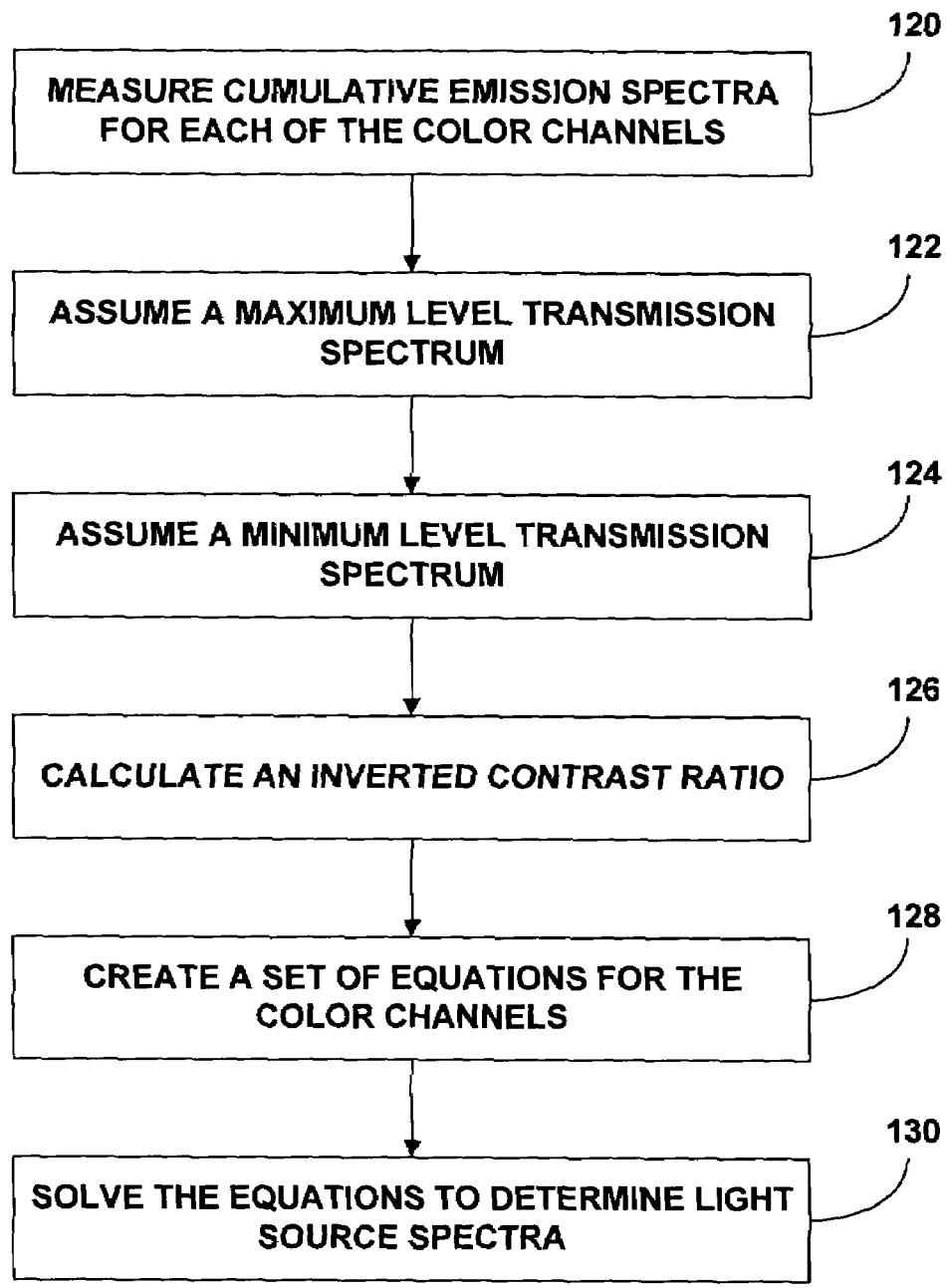
FIG. 6 is a flow diagram illustrating another method for reconstructing light source emission spectra for the multi-channel liquid crystal display.

FIG. 6 is a flow diagram illustrating another method for reconstructing light source emission spectra 34 for the multi-channel liquid crystal display described above. Device color model 32 uses the light source emission spectra 34 to model and calibrate the display. The cumulative emission spectrum 54 is measured for each of the color channels 80 (120) with the respective channel at a maximum level and the other channels at minimum levels. Transmission spectra are assumed to be known for the light valves within the color channels 80. Assumed transmission spectrum 56 is assumed for one of the light valves operating at a maximum level (122).

A minimum transmission spectrum is assumed for one of the light valve operating at a minimum level (124). The assumed transmission spectra are known with accuracy between 5% and 20%. One of the methods discussed in reference to FIG. 3 may be used to determine the assumptions. The inverted contrast ratio 62 is calculated (126) based on assumed maximum transmission spectrum 56 and the assumed minimum transmission spectrum.

Color channel emission spectra 54, assumed maximum transmission spectrum 56, and calculated inverted contrast ratio 62 are applied to equation solver module 64 within light source reconstruction module 52 to create a set of equations for the light source emission spectra of the color channels 80 (128). The set of equations is then solved by equation solver module 64 for each of light source spectra 34 (130).

The method illustrated in FIG. 6 results in a reduced hue shift compared to the shift of $\Delta E=16$ experienced when no reconstruction method is applied to the light sources. However, the assumed inverted contrast ratio causes a larger hue shift to occur than the measured inverted contrast ratio used in the method illustrated in FIG. 5.

Various embodiments of the invention have been described. These and other embodiments are within the scope of the following claims.

The invention claimed is:

1. A method for reconstructing color channels in a display device, the method comprising:
   measuring a first emission spectrum of a display for a maximum display level;
   measuring a second emission spectrum of the display for a minimum display level;
   measuring cumulative emission spectra for each of a plurality of color channels of a display with the respective color channel at a maximum level and the other channels at minimum levels;
   assuming a transmission spectrum for a light valve in the display operating at a maximum level;
   determining an inverted contrast ratio based on the first emission spectrum measurement and the second emission spectrum measurement;
   creating a set of equations for the color channels based on the measured cumulative emission spectra for the color channels, the measured inverted contrast ratio, and the assumed transmission spectrum; and
   solving the equations to determine a reconstructed light source spectrum for each of the color channels in the display device.

2. The method of claim 1, wherein the cumulative emission spectrum of the display comprises a summation of all color channel emission spectra.

3. The method of claim 2, wherein the emission spectrum for each of the color channels combines the light source spectrum for the color channel and the transmission spectrum for the light valve.

4. The method of claim 1, wherein the light source spectrum for each of the color channels comprises a backlight spectrum and a transmittance spectrum for a filter of each color channel.

5. The method of claim 1, wherein the transmission spectrum is dependent upon a digital driving signal and the wavelength of the light source.

6. The method of claim 1, wherein assuming the transmission spectrum for the light valve includes at least one of:
   assuming the cumulative emission spectrum for the respective color channel constitutes the light source spectrum for the color channel;
   using default parameters for a particular type of the display;
   squaring a cosine function of a phase retardation associated with the light valve; and
   squaring a sine function of the phase retardation associated with the light valve.

7. The method of claim 1, wherein the first emission spectrum measurement comprises all the color channels operating at a maximum digital driving signal to generate a white display.

8. The method of claim 1, wherein the second emission spectrum measurement comprises all the color channels operating at a minimum digital driving signal to generate a black display.

9. The method of claim 1, wherein the plurality of color channels comprises a red channel, a green channel, and a blue channel.

10. The method of claim 1, wherein the display comprises a liquid crystal display (LCD).

11. A multi-channel display system comprising:
   a display;
   a plurality of color channels in the display;
   a light source and a light valve to model each of the color channels; and
   means for driving the light valve based on a color profile defined by light source spectra, the light source spectra reconstructed from measured emission spectra for the color channels, an inverted contrast ratio for the display, and an assumed transmission spectrum for the light valve in the display.

12. The multi-channel display system of claim 11, wherein the display comprises a liquid crystal display (LCD).

13. The multi-channel display system of claim 11, wherein the light source comprises a backlight and color filters.

14. The multi-channel display system of claim 11, wherein the light valve comprises fixed polarizers and rotating liquid crystal cells (LCC).

15. The multi-channel display system of claim 14, wherein the LCC rotation depends on a wavelength of the light source and a digital driving signal.

16. The multi-channel display system of claim 11, wherein the plurality of color channels comprise a red channel, a green channel, and a blue channel.

17. The multi-channel display system of claim 11, wherein the driving means sets a digital driving signal of the light valve based on the color profile.

18. A computer-readable medium comprising instructions for causing a programmable processor to:
receive cumulative emission spectrum measurements for each of a plurality of color channels of a display with the respective color channel at a maximum level and the other channels at minimum levels;
assume a transmission spectrum for a light valve in the display operating at a maximum level;
determine an inverted contrast ratio for the display;
solve a set of equations to determine a light source spectrum for each of the color channels based on the measured cumulative emission spectra for the color channels, the inverted contrast ratio, and the assumed transmission spectrum; and
drive the light valve based on a color profile defined by the light source spectra.

19. The computer-readable medium of claim 18, wherein the inverted contrast ratio of the display is based on a measured first emission spectrum of the display for a maximum display level and a measured second emission spectrum of the display for a minimum display level.

20. The computer-readable medium of claim 18, wherein the inverted contrast ratio of the display is based on the assumed transmission spectrum for the light valve in the display operating at the maximum level and an assumed transmission spectrum for the light valve in the display operating at a minimum level.

21. The computer-readable medium of claim 18, wherein the instructions for causing a programmable processor to assume the transmission spectrum for the light valve includes at least one of instructions for causing a programmable processor to:
assume the cumulative emission spectrum for the respective color channel constitutes the light source spectrum for the color channel;
use default parameters for a particular type of the display;
square a cosine function of a phase retardation associated with the light valve; and
square a sine function of the phase retardation associated with the light valve.

22. The computer-readable medium of claim 18, wherein the instructions for causing a programmable processor to drive the light valve comprise instructions for causing a programmable processor to set a digital driving signal of the light valve based on the color profile.

23. A method for displaying on a display device, the method comprising:
measuring cumulative emission spectra for each of a plurality of color channels of a display with the respective color channel at a maximum level and the other channels at minimum levels;
assuming a first transmission spectrum for a light valve in the display operating at a maximum level;
assuming a second transmission spectrum for the light valve in the display operating at a minimum level;
calculating an inverted contrast ratio based on the first transmission spectrum assumption and the second transmission spectrum assumption;
creating a set of equations for the color channels based on the measured cumulative emission spectra for the color channels, the calculated inverted contrast ratio, and the assumed first transmission spectrum; and
solving the equations to determine a light source spectrum for each of the color channels of the display device.

24. The method of claim 23, wherein the cumulative emission spectrum of the display comprises a summation of all color channel emission spectra.

25. The method of claim 24, wherein the emission spectrum for each of the color channels combines the light source spectrum for the color channel and the transmission spectrum for the light valve.

26. The method of claim 23, wherein the light source spectrum for each of the color channels comprises a backlight spectrum and a transmittance spectrum for a filter of each color channel.

27. The method of claim 23, wherein the first transmission spectrum assumption comprises the light valve operating at a maximum digital driving signal to allow a maximum amount of light to be emitted.

28. The method of claim 23, wherein the second transmission spectrum assumption comprises the light valve operating at a minimum digital driving signal to allow a minimum amount of light to be emitted.

29. The method of claim 23, wherein the plurality of color channels comprises a red channel, a green channel, and a blue channel.

30. The method of claim 23, wherein the display comprises a liquid crystal display (LCD).

31. The method of claim 23, wherein the transmission spectrum is dependent upon a digital driving signal and the wavelength of the light source.

32. The method of claim 23, wherein assuming the transmission spectrum for the light valve includes at least one of:
assuming the cumulative emission spectrum for the respective color channel constitutes the light source spectrum for the color channel;
using default parameters for a particular type of the display;
squaring a cosine function of a phase retardation associated with the light valve; and
squaring a sine function of the phase retardation associated with the light valve.

* * * * *